United States Patent
Wang et al.

(10) Patent No.: US 7,866,696 B2
(45) Date of Patent: Jan. 11, 2011

(54) VEHICLE SEAT ASSEMBLY

(75) Inventors: Jenne-Tai Wang, Rochester, MI (US); Bing Deng, Rochester Hills, MI (US); Margaret M. Andreen, Fenton, MI (US); Janet S. Goings, Commerce Township, MI (US); Dorel M. Sala, Troy, MI (US); Daniel Shakespear, Lake Orion, MI (US); Mark A. Kramarczyk, Sterling Heights, MI (US); Gary L. Jones, Farmington Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 893 days.

(21) Appl. No.: 11/293,860

(22) Filed: Dec. 2, 2005

(65) Prior Publication Data

US 2006/0138797 A1 Jun. 29, 2006

Related U.S. Application Data

(60) Provisional application No. 60/634,970, filed on Dec. 10, 2004.

(51) Int. Cl.
*B60R 21/02* (2006.01)
*B60N 2/02* (2006.01)
*A47C 3/00* (2006.01)

(52) U.S. Cl. ............... 280/748; 296/68.1; 297/284.11

(58) Field of Classification Search .............. 280/748; 296/68.1, 65.09, 65.05; 297/284.11, 68, 297/284.9

See application file for complete search history.

(56) References Cited

U.S. PATENT DOCUMENTS

| | | | |
|---|---|---|---|
| 3,464,736 A | 9/1969 | Mizelle | |
| 3,591,232 A | 7/1971 | Simon | |
| 3,998,291 A * | 12/1976 | Davis | 180/274 |
| 4,636,002 A * | 1/1987 | Genjiro | 297/319 |
| 4,898,424 A * | 2/1990 | Bell | 297/367 |
| 5,125,472 A * | 6/1992 | Hara | 180/271 |
| 5,611,601 A | 3/1997 | Cowgur | 297/393 |
| 5,707,112 A * | 1/1998 | Zinn | 297/378.14 |
| 5,746,467 A * | 5/1998 | Jesadanont | 296/68.1 |
| 5,810,417 A * | 9/1998 | Jesadanont | 296/68.1 |
| 5,823,627 A | 10/1998 | Viano et al. | 297/471 |
| 5,884,970 A * | 3/1999 | Howard | 297/362.14 |
| 5,971,467 A * | 10/1999 | Kayumi et al. | 296/66 |
| 6,076,856 A | 6/2000 | Wang et al. | 280/806 |
| 6,227,563 B1 * | 5/2001 | Talisman | 280/735 |
| RE37,928 E * | 12/2002 | Howard | 297/362.14 |
| 6,805,403 B2 | 10/2004 | Buch | 297/146 |
| 6,813,562 B2 | 11/2004 | Altan et al. | 701/301 |
| 2006/0273644 A1* | 12/2006 | Sturt et al. | 297/284.9 |

* cited by examiner

*Primary Examiner*—Paul N. Dickson
*Assistant Examiner*—Joselynn Y. Sliteris
(74) *Attorney, Agent, or Firm*—Quinn Law Group, PLLC

(57) ABSTRACT

A seat assembly for a vehicle includes a lower seat portion and a seatback portion. The seatback portion is selectively movable to vary the reclination angle of the seatback portion. The seat assembly is configured so that a first part of the lower seat portion rises relative to a second part of the lower seat portion so that the lower seat portion acts as an occupant restraint when a predetermined condition exists. Exemplary predetermined conditions include the reclination angle changing, the reclination angle exceeding a predetermined amount, and conditions indicative of an elevated risk of vehicle impact.

9 Claims, 6 Drawing Sheets

VEHICLE SEAT ASSEMBLY

CROSS REFERENCE TO RELATED APPLICATIONS

This application claims the benefit of U.S. Provisional Patent Application No. 60/634,970, filed Dec. 10, 2004, and which is hereby incorporated by reference in its entirety.

TECHNICAL FIELD

This invention relates to vehicle seat assemblies having a seatback portion that is selectively reclinable and a lower seat portion that is configured to move automatically so as to act as an occupant restraint in response to a predetermined condition.

BACKGROUND OF THE INVENTION

Seat assemblies for passenger vehicles typically include a lower seat portion that is generally horizontally oriented and a seatback portion that is selectively pivotable between a generally vertically oriented, upright position and one or more reclined positions for occupant comfort when the vehicle is at rest.

SUMMARY OF THE INVENTION

A restraint system for a vehicle occupant is provided. The restraint system includes a vehicle seat assembly with a lower seat portion and a seatback portion. The seatback portion is characterized by a reclination angle, and is selectively movable to vary the reclination angle. The lower seat portion is selectively movable such that the height of a first part of the lower seat portion with respect to a second part of the lower seat portion is variable.

The seat assembly is configured such that the first part of the lower seat portion rises relative to the second part of the lower seat portion automatically in response to the existence of at least one predetermined condition. When the first part is elevated relative to the second part, the lower seat portion acts to restrain the lower torso of an occupant of the seat assembly in the event of a vehicle impact.

In exemplary embodiments, the at least one predetermined condition is related to the position of the seatback portion or is indicative of an elevated risk of vehicle impact. For example, the at least one predetermined condition may include any movement of the seatback portion that results in an increase of the reclination angle. Similarly, the at least one predetermined condition may include the reclination angle exceeding a predetermined value.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
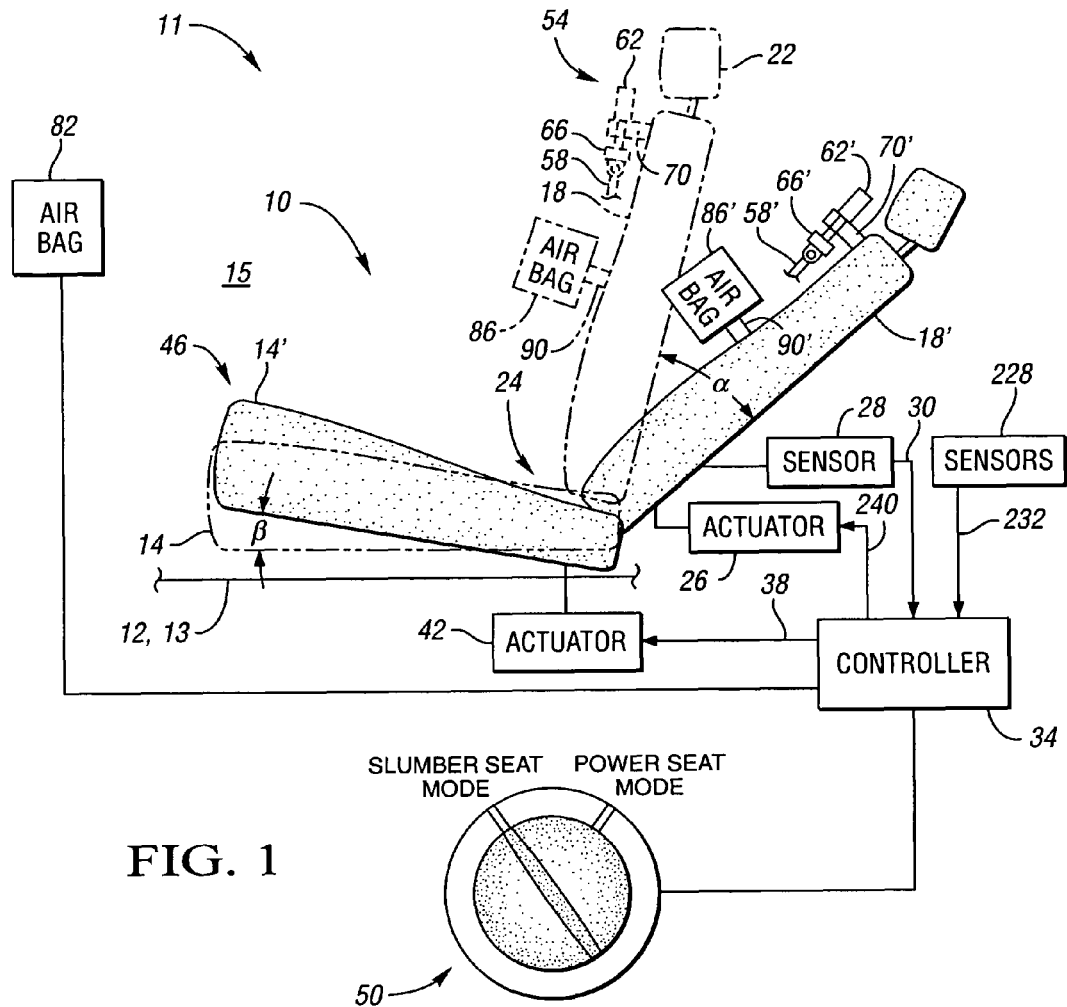
FIG. 1 is a schematic side view of a seat assembly having a control system configured so that the lower seat portion is automatically adjusted in response to movement of the seatback portion.

Referring to FIG. 1, a vehicle seat assembly 10 is schematically depicted in a vehicle 11. The vehicle 11 includes a vehicle body 12 having a floor 13 which at least partially defines a passenger compartment 15. The seat assembly 10 is mounted with respect to the floor 13 and is located within the passenger compartment 15. The seat assembly 10 includes a lower seat portion 14, also sometimes referred to as a "seat base," and a seatback portion 18 with a headrest 22. The seat assembly 10 is shown in a first configuration in which the seatback portion 18 and the lower seat portion 14 are in respective first positions. The seatback portion 18 is selectively pivotable about a transverse horizontal axis adjacent the rearward end 24 of the lower seat portion 14. In the embodiment depicted, the seatback portion 18 is pivoted by a power actuator 26, such as a servomotor. An occupant of the seat assembly adjusts the reclination angle $\alpha$ of the seatback portion 18, i.e., pivots the seatback portion 18, by manipulating a switch (not shown) that controls the actuator 26. Alternatively, and within the scope of the claimed invention, the reclination angle $\alpha$ of the seatback portion 18 may be controlled and adjusted manually.

A sensor 28 is configured to monitor the position of the seatback portion and to transmit a signal (represented by the line 30) indicative of the position of the seatback portion to a controller 34. The signal 30 is also indicative of the reclination angle $\alpha$, which may be measured between the seatback member in the generally upright first position and a subsequent position, as shown in FIG. 1 or the angle formed between the seatback member and another reference such as a vertical or horizontal line or plane, part of the vehicle body 12, etc.

The controller 34 includes a microprocessor, ROM and RAM and appropriate input and output circuits of a known type for receiving the various input signals and for outputting control signals. The controller is programmed and configured to process signal 30 according to a stored algorithm to determine a predetermined lower seat portion position corresponding to the seatback portion position transmitted by signal 30. The lower seat portion 14 is selectively pivotable about a horizontal axis adjacent its rearward end 24. The controller 34 is configured to transmit a signal 38 to an actuator 42, such as a servomotor or a solenoid. The actuator 42 is responsive to the signal 38 to cause the lower seat portion to pivot to the predetermined lower seat portion position corresponding to the seatback portion position. Thus, the sensor 28, controller 34, and actuator 42 cooperate to continuously monitor the position and angle of the seatback portion 18 and to adjust the lower seat portion 14 in response to any change in the position and angle of the seatback portion 18. For example, when an occupant pivots the seatback portion from the first position, shown at 18, to a second position, shown at 18', the lower seat portion is automatically moved by the actuator 42 from the first position shown at 14 to a second position shown at 14', where the second position of the lower seat portion corresponds to the second position of the seatback portion according to the stored algorithm. The seatback portion 18' in the second position is reclined further than the seatback portion 18 in the first position, and the forward portion 46 of the lower seat portion is higher relative to the rearward end 24 of the lower seat portion when the lower seat portion is in the second position than in the first position.

Angle $\beta$ is formed between the lower seat portion in the first position and the lower seat portion in a subsequent position, or between the lower seat portion and another reference such as the floor 13 or a horizontal line or plane. The controller 34 is configured so that as the reclination angle $\alpha$ increases, i.e., as the seatback portion reclines, the angle $\beta$ automatically increases according to the predetermined relationship $\beta=f(\alpha)$, which may vary depending on the dimensions of the seat assembly 10, the vehicle in which the seat assembly is installed, etc. Tilting the lower seat portion 14 to raise the forward portion 46 relative to the rearward end 24 enables the lower seat portion 14 to act as an additional occupant restraint when the seatback portion 18 is reclined. Advantageously, the present invention provides a predetermined restraint system to a vehicle occupant in the reclined position utilizing the seat assembly and the seat belt restraint system, thereby enabling a vehicle occupant to use the reclined seat position during vehicle operation, which is not possible with current systems.

It is preferable that the seat assembly 10 be used in conjunction with a seat belt system, such as the three-point seat belt system having a lap belt and shoulder belt described in U.S. Pat. No. 5,823,627, issued Oct. 20, 1998 to Viano et al, and which is hereby incorporated by reference in its entirety. It is also preferable for the seat belt system to be equipped with a pretensioner to pretighten the lap and/or shoulder belt in the event of a vehicle impact. An exemplary pretensioner is described in U.S. Pat. No. 6,076,856, issued Jun. 20, 2000 to Wang et al., and which is hereby incorporated by reference in its entirety. The pretensioner may be a buckle pretensioner, a retractor pretensioner, etc. A motorized seat belt pretensioner may also be employed in conjunction with a collision avoidance system whereby a motor provides pretension prior to a possible vehicle impact.

A selection switch 50 is movable to allow an occupant to choose either a first mode of operation, referred to herein as the "power seat mode," or a second mode of operation, referred to herein as the "slumber seat mode." The switch 50 is operatively connected to the controller 34 such that, should the occupant choose the slumber seat mode, the adjustment of the lower seat portion angle $\beta$ will synchronize with the seatback angle $\alpha$ as described above. When the occupant selects "power seat mode," the controller is configured to allow the seatback portion and the lower seat portion to move independently.

It will be appreciated that the vehicle seat assembly 10 may provide either an additional restraint to the existing vehicle restraint system or may provide a cooperative restraint system with a seat belt system or other supplemental restraint systems. For example, the seat belt system may be mounted either on the seat or on the vehicle or on a combination thereof. The seat belt may also be positioned in response to the angle of the seat back portion. For example, either the shoulder or the lap portions of the seat belt system may be moved as a function of the position and angle $\alpha$ of the seatback. During the power seat mode or normal operating mode, the seat belt and/or supplemental restraint would remain stationary with respect to the body and operate in their normal modes up to a certain predetermined first reclination angle of the seat back portion that is generally upright or slightly reclined—e.g., up to an exemplary angle of about 20 degrees reclination. However, during the slumber mode when the seat back is reclined past the first reclination angle up to a second reclination angle greater than the first angle, then the lower seat portion, the seat belt system and/or another supplemental restraint system would be coupled to move to certain predetermined restraint positions and could not move independently of each other, thus providing a predetermined cooperative restraint system to the occupant using the slumber mode. The seat belt system and the supplemental restraint system may be mechanically coupled to the seat back position or electronically coupled to the seat back position using either same or additional sensors, controllers, and actuators as the lower seat portion.

In the embodiment depicted, the seat belt system 54 includes a seat belt webbing 58 operatively connected to a retractor 62. A latch plate 66 is connected to the seat belt webbing 58 as understood by those skilled in the art. The webbing 58 is extendable from the retractor such that the webbing extends across an occupant of the seat as understood by those skilled in the art. The latch plate 66 is engageable with a buckle (not shown) adjacent the lower seat portion 14 to retain the webbing 58 in the extended position.

The retractor 62 is connected to a member 70 that is connected to the seatback portion 18 for unitary movement therewith. Thus, for each position of the seatback portion 18, i.e., for each value of reclination angle $\alpha$, there is a corresponding position of the retractor 62 with respect to the vehicle body. For a change in angle $\alpha$, there is a corresponding change in the position of retractor 62. For example, when the seatback portion is moved from the first position shown at 18 to the second position shown at 18', member 70 moves the retractor 62, and correspondingly the webbing 58 and the latch plate 66, to new positions shown at 62', 58', and 66', respectively.

Alternatively, the seat belt buckle and/or retractor may be on a track, rack and pinion, etc. for movement by an actuator in response to reclination of the seat back portion. In an alternative embodiment, the retractor 62 is connected to a track (not shown) and is selectively movable along the track. An actuator (not shown), such as a servomotor, is operatively connected to the retractor 62 to move the retractor 62, and correspondingly the webbing 58 and the latch plate 66, along the track. For each position of the seatback portion 18, i.e., for each value of reclination angle $\alpha$, the controller 34 is configured to determine a corresponding position of the retractor 62 along the track according to the stored algorithm when the controller 34 is in the slumber mode. The controller 34 transmits a signal to the actuator, which causes the actuator to move the retractor 62 to the corresponding position. Thus, for a change in angle $\alpha$, there is a corresponding change in the position of retractor 62 on the track.

The embodiment depicted in FIG. 1 also includes two supplemental restraints, namely a frontal air bag 82 and a side air bag 86. The side air bag 86 is connected to a member 90 that is connected to the seatback portion 18. For each position of the seatback portion 18, there is a corresponding position of the air bag 86 with respect to the vehicle body. Thus, for a change in angle $\alpha$, there is a corresponding change in the position of airbag 86. For example, when the seatback portion 18 is moved to the position shown at 18', the member 90 causes the air bag to move from the position shown at 86 to a new position shown at 86'.

In an alternative embodiment, the side air bag 86 (shown schematically in FIG. 1) is operatively connected to a track (not shown) and is selectively movable along the track. An actuator (not shown), such as a servomotor, is operatively connected to the air bag 86 to move the air bag 86 along the track. For each position of the seatback portion 18, the controller 34 is configured to determine a corresponding position of the air bag 86 along the track according to the stored algorithm when the controller 34 is in the slumber mode. The controller 34 transmits a signal to the actuator, which causes the actuator to move the air bag 86 to the corresponding position. Thus, for a change in angle $\alpha$, there is a corresponding change in the position of airbag 86 on the track.

It should be noted that the side air bag 86 and the seat belt system 54 are depicted schematically in FIG. 1. The air bag 86 and the seat belt retractor 62 may be integrated with the seat back portion 18 in a non-intrusive manner, e.g., the side airbag 86 may be sewn inside the seat back portion 18 to be somewhat imperceptible to the vehicle occupants, and the retractor 62 may be on the upper corner of the seatback portion 18.

Further, air bags 82, 86 or other supplemental restraints may be configured so that their inflation pressure, deployment force, or deployment depth is automatically adjusted as a function of the angle $\alpha$ of reclination of the seat back portion. In the context of the present invention, "function of" means "determined, at least in part, by." For example, side air bag 86 may be controlled by the controller 34 not to inflate or deploy when the angle $\alpha$ is greater than a predetermined amount. Similarly, frontal air bag 82 (shown schematically in FIG. 1 in an instrument panel position) may be controlled by the controller so that its inflation pressure, deployment force, or deployment depth increases as angle $\alpha$ increases. Air bag inflation pressure or deployment force may also be adjusted as a function of occupant size, weight, etc.

It will further be appreciated that the supplemental restraint system could be provided by any appropriate restraint device specially positioned relative to the occupant when using the slumber mode, such as an inflatable air bag, foam, expandable crush structures such as honeycomb or deployable smart materials, or supplemental structural restraints such as a positionable structural arm or wall. All of these devices may be resettable to the normal mode of operation in the case of an imminent or possible crash, as discussed further below with regard to the lower seat portion.

Figure 2:
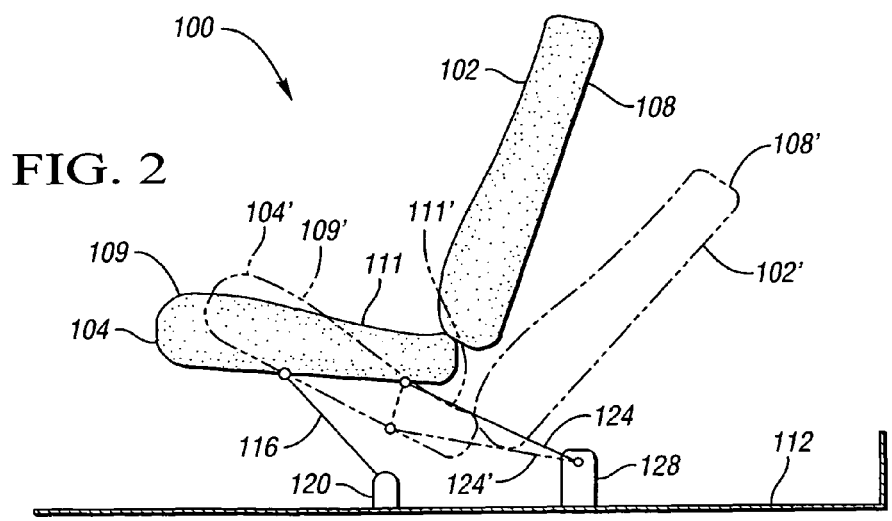
FIG. 2 is a schematic side view of another seat assembly having a mechanical linkage substantially rigidly interconnecting a seatback portion and lower seat portion so that when the seatback portion reclines, the lower seat portion tilts rearward.

Referring to FIG. 2, an alternative seat assembly 100 is schematically depicted. Seat assembly 100 includes a seat 102 having a lower seat portion 104 and a seatback portion 108. The lower seat portion 104 and the seatback portion 108 are rigidly connected for unitary movement so that the angle formed between the lower seat portion 104 and the seatback portion 108 remains substantially constant. The lower seat portion is characterized by a forward portion 109 and a rearward portion 111. The seat 102 is connected to a vehicle floor 112 by a four bar linkage. More specifically, a first link 116 is pivotably connected to the lower seat portion 104 at one end and is pivotably connected to a first bracket 120 at the other end. The first bracket 120 is rigidly connected with respect to the floor 112. A second link 124 is pivotably connected to the lower seat portion 104 at one end and is pivotably connected to a second bracket 128 at the other end. The second bracket 128 is rigidly connected with respect to the floor 112. The links 116, 124 are shown connected to the lateral edges of the lower seat portion 104 to avoid physical part interference between the links and the seat 102 during the operation described below.

Pivoting of one or both of the first and second links 116, 124 causes the seat to move so that the reclination angle of the seatback portion varies. Since the seatback portion and the lower seat portion are substantially rigidly connected to one another, such movement of the seatback portion also causes the angle formed by the lower seat portion and the floor 112 to change. In the embodiment depicted, link 124 is rotatable forward from a first position, shown at 124, to a second position, shown at 124', causing the lower seat portion to move from a first position shown at 104 to a second position shown at 104' and the seatback portion to move from a first position shown at 108 to a second position shown at 108'. Correspondingly, the forward portion moves from a first position, shown at 109 to a second position, shown at 109', and the rearward portion moves from a first position shown at 111 to a second position shown at 111'. The seatback portion in the second position is reclined further than in the first position. The lower seat portion in the second position is tilted with respect to the first position so that the front portion of the lower seat portion is higher, relative to the rear portion of the lower seat portion, in the second position than in the first position.

The four-bar linkage mechanism enables an occupant to manually and simultaneously adjust the lower seat portion and the seatback portion so that a proper lower seat portion tilting angle can be achieved when the seatback portion is adjusted to a reclining position. It should be noted that, within the scope of the claimed invention, a lower seat portion rigidly connected to a seatback portion for unitary movement may be a lower seat portion that is selectively movable with respect to a seatback portion. For example, and within the scope of the claimed invention, seatback portion 108 may be pivotably connected to lower seat portion 104 to enable the seat to be stowed. However, the lower seat portion and the seatback portion may also be lockable with respect to one another for unitary movement.

Figure 3:
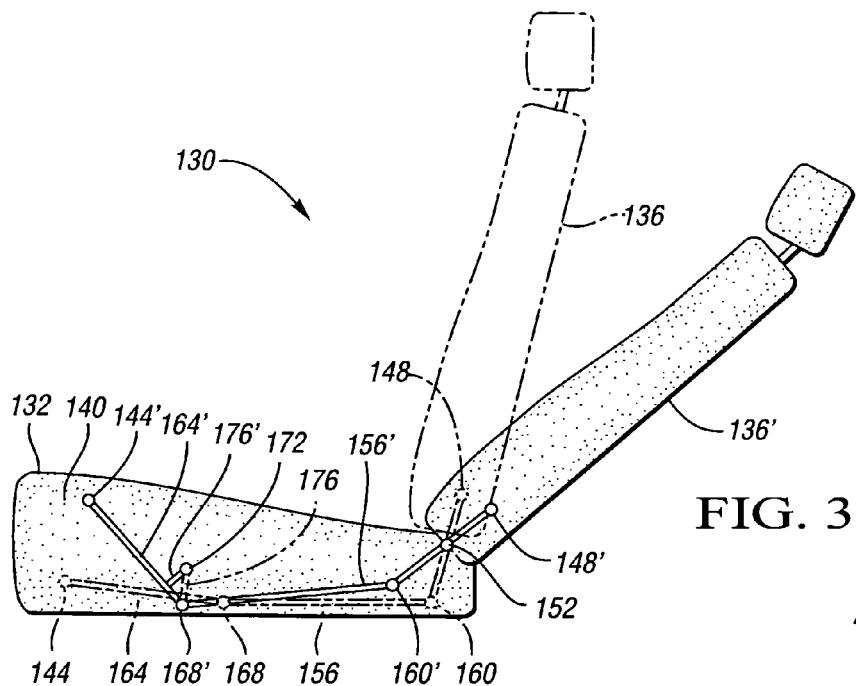
FIG. 3 is a schematic sectional side view of another seat assembly in which the lower seat portion cushion has a transversely oriented bar therein configured to automatically rise in response to the seatback portion reclining.

Referring to FIG. 3, another alternative seat assembly 130 is schematically depicted. The seat assembly 130 includes a lower seat portion 132 and a seatback portion 136. The seatback portion 136 is selectively pivotable with respect to the lower seat portion 132. The lower seat portion 132 includes a cushion 140. A transversely oriented member, e.g., bar 144, is located inside the cushion 140.

A first link 148 is connected to the seatback portion and is pivotable about a first pivot 152 so that pivoting the seatback portion 136 causes the first link 148 to be pivoted about the first pivot 152. A second link 156 is pivotably connected to the first link 148 at a first joint 160 inside the lower seat portion 132, and is pivotably connected to a third link 164 at a second joint 168. The third link 164 is rigidly connected to the bar 144 at one end and is rotatable about a second pivot 172 via a fourth link 176. The first and second pivots are stationary with respect to the lower seat portion 132.

The seatback portion 136 is selectively pivotable to vary the seatback reclination angle. The seat assembly 130 is configured such that increasing the reclination angle automatically results in an increase in the height of bar 144 relative to the seat cushion 140. Similarly, reducing the reclination angle of the seatback portion 136 causes the height of the bar 144 to decrease. For example, the seatback portion is selectively movable between a first position shown at 136 and a second position shown at 136'. When the seatback portion is pivoted and reclined to the second position, the first link 148 rotates about pivot 152 to a second position shown at 148', which causes forward movement of the second link to a second position shown at 156'. The second link causes the third link to rotate about pivot 172 to a second position shown at 164', causing the bar to move vertically, i.e., upward from a first position shown at 144 to the second position as shown at 144'. The bar 144' in the second position is configured to interact with a seat occupant to restrain the occupant's lower torso in the event of a vehicle impact.

The raised bar 144' can provide a lower torso restraint force and restrict forward excursion without tilting the lower seat portion 132. It can thus provide more seat adjustment freedom to the occupant.

Figure 4:
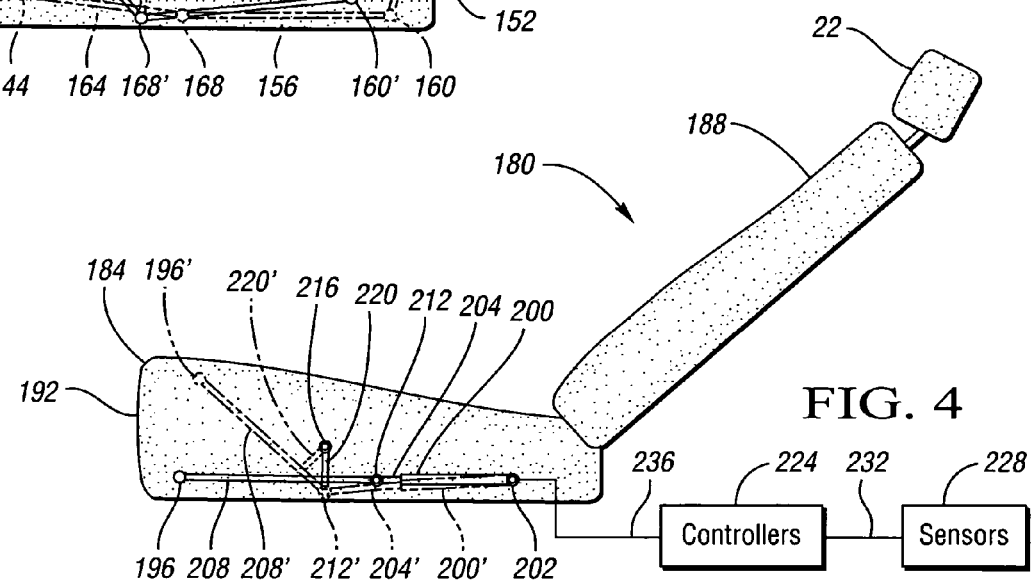
FIG. 4 is a schematic sectional side view of a seat assembly having a transversely oriented bar in a lower seat cushion activatable by an actuator and controlled by a collision avoidance system.

Referring to FIG. 4, another alternative seat assembly 180 is schematically depicted. The seat assembly 180 includes a lower seat portion 184 and a seatback portion 188. The seatback portion 188 is selectively pivotable with respect to the lower seat portion 184 to vary the reclination angle of the seatback portion 188. The lower seat portion 184 includes a cushion 192. The lower seat portion 184 includes a transversely oriented member, e.g., bar 196, located inside the cushion 192.

An actuator 200 is connected to a first link 204. The actuator 200 is configured to selectively extend the link 204, i.e., force the link 204 forward with respect to the vehicle. The actuator 200 may be pyrotechnic, pneumatic, hydraulic, electric, etc. within the scope of the claimed invention. The actuator 200 is pivotably connected to the structure of the lower seat portion 184 by pivot 202. Link 204 is pivotably connected to a second link 208 via joint 212. Link 208 is rotatable with respect to joint 216 via link 220. Link 208 is also connected to bar 196. Joint 216 is stationary with respect to the lower seat portion 184.

The actuator 200 is configured to selectively deploy, causing the extension of link 204 to an extended position shown at 204', which in turn causes joint 212 to move forward to the position shown at 212', which in turn causes the rotation of link 208 about joint 216 to a rotated position shown at 208', thereby causing the bar 196 to be raised to an elevated position shown at 196'.

A controller 224 is part of a collision avoidance system that includes sensors 228. The sensors 228 monitor the vehicle environment and transmit signals 232 carrying sensor data describing vehicle environmental conditions to the controller 224. The controller 224 is programmed to analyze the sensor data from signals 232 to determine if one or more predetermined vehicle conditions indicative of an elevated risk of vehicle collision exist. The controller 224 includes a data storage medium with stored data that the controller 224 uses to determine the presence or absence of the one or more predetermined conditions based on the sensor data. Those skilled in the art will recognize that the stored data may be in a multitude of forms within the scope of the claimed invention, such as relational databases, look-up tables, formulae, etc.

Those skilled in the art will recognize a variety of collision avoidance system configurations that may be employed within the scope of the claimed invention. For example, sensors 228 may include radar sensors, video sensors, photoelectric sensors, etc. The collision avoidance system may also include radar transmitters (not shown). An exemplary collision avoidance system is described in commonly assigned U.S. Pat. No. 6,813,562, issued Nov. 2, 2004 to Altan et al, and which is hereby incorporated by reference in its entirety.

When the controller determines the existence of the one or more predetermined conditions indicative of an elevated risk of vehicle collision, it is configured to transmit a signal 236 to which actuator 200 is responsive to extend link 204, thereby causing the bar 196 to rise to the position shown at 196'.

Both pre-impact sensors and impact sensors could be used to trigger the actuation of actuator 200. However, for actuators that are non-resettable, such as pyrotechnic inflators, impact sensors should be employed so that the actuator deploys only in the event of an impact. For resettable actuators, e.g., electrical motors, pre-impact sensors will are desirable to provide a timely actuation.

Referring again to FIG. 1, the controller 34 is part of a collision avoidance system that includes sensors 228. The sensors 228 monitor the vehicle environment and transmit signals 232 carrying sensor data describing vehicle environmental conditions to the controller 34. The controller 34 operates in the same manner as the collision avoidance system controller shown at 224 in FIG. 4 to determine whether one or more predetermined conditions indicative of an elevated risk of vehicle impact exist.

Figure 5:
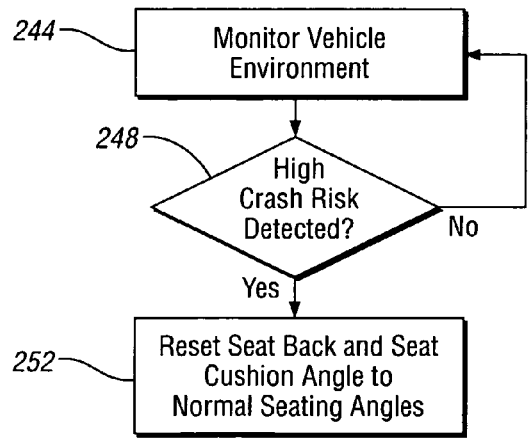
FIG. 5 is a flow chart illustration of a method for use with the seat assembly of FIG. 1.

FIG. 5 depicts a method of controlling the seatback portion 18 and an exemplary control logic for the controller 34 of FIG. 1 when the controller 34 is in the slumber mode and the seatback portion 18 is in a reclined position. Referring to FIGS. 1 and 5, the sensors 228 monitor the vehicle environment (step 244). The controller 34 determines whether the one or more predetermined conditions indicative of an elevated risk of vehicle collision exist at decision 248. If so, the controller transmits a signal 240 to which actuator 26 is responsive to move the seatback member (step 252) to a generally upright, vertical position, such as the first position shown at 18. The controller 34 may also cause the actuator 42 to return the lower seat portion to the first position shown at 14.

Figure 6:
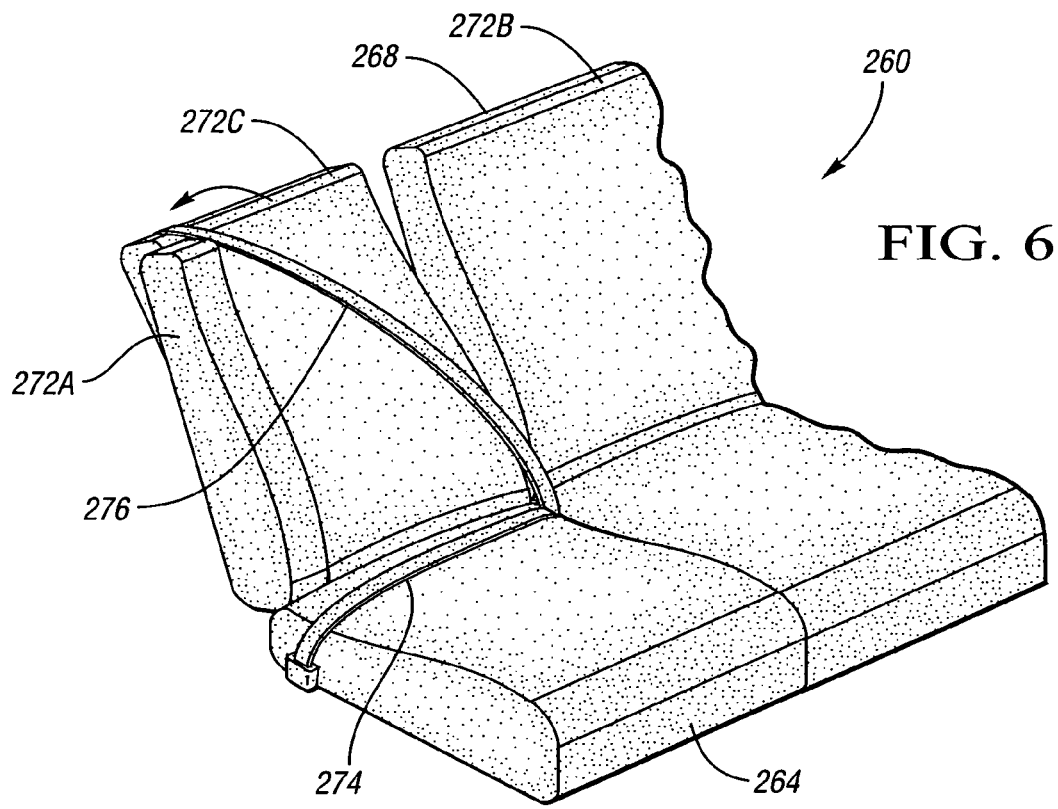
FIG. 6 is a schematic perspective view of another seat assembly having a pivotable seatback portion between two stationary seatback portions.

Referring to FIG. 6, yet another seat assembly 260 is schematically depicted. The seat assembly 260 includes a lower seat portion 264 and a seatback portion 268. The seat assembly may operate in a manner similar to any of the seat assemblies of FIGS. 1-4. The seatback portion 268 includes two stationary portions 272A, 272B on lateral sides of a selectively pivotable portion 272C. When portion 272C is pivoted into a reclined position, as shown in FIG. 6, the stationary portions 272A, 272B are less reclined than portion 272C. Portions 272A and 272B provide lateral support for an occupant resting against portion 272C and may offer side impact benefits. Alternatively, and within the scope of the claimed invention, portions 272A, 272B may be movable. For example, portions 272A, 272B may be movable, but fixed with respect to portion 272C so that the spatial relationship between portions 272A, 272B and 272C shown in FIG. 6 is retained as portion 272C is reclined further.

The seat assembly 260 also includes a seat belt system including a lap belt 274 and a shoulder belt 276. The seat assembly 260 also preferably includes mechanical means (not shown) to pre-tighten the lap belt 274. The mechanical means to pre-tighten the lap belt could be a buckle pretensioner, a retractor pretensioner, or a motorized seat belt pre-pretensioner, etc., or any combination of these means.

Figure 7:
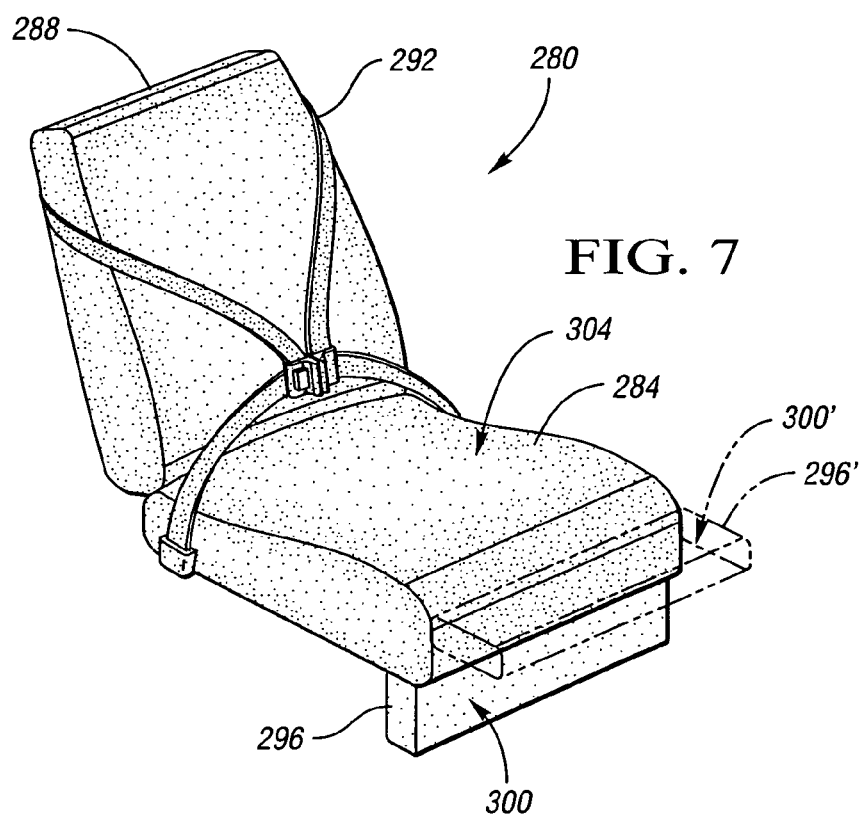
FIG. 7 is a schematic perspective view of another seat assembly including a lower seat portion having an adjustable leg rest.

Referring to FIG. 7, another seat assembly configuration 280 is schematically depicted. The seat assembly 280 includes a lower seat portion 284 and a seatback portion 288. The seat assembly 280 may operate in a manner similar to the seat assemblies of FIGS. 1-5 and 7. The seat assembly 280 further includes a four-point seat belt 292 to restrain an occupant. The seat assembly 280 also preferably includes mechanical means (not shown) to pre-tighten the seat belt 292. The seat assembly 280 also includes an adjustable lower seat extension member 296 that defines an extension surface 300. The extension member is depicted in a stowed position at 296, in which the extension member 296 is underneath lower seat portion 284. The extension member, and correspondingly the extension surface, is selectively rotatable and movable upward to a deployed position, shown at 296' and 300', respectively, in which surface 300' is substantially contiguous with the occupiable surface 304 of the lower seat portion 284, thereby to extend the effective length of lower seat portion's occupiable surface 304. The extension member 296 is preferably configured to move to the deployed position automatically when the seatback portion 288 is moved to a reclined position.

Figure 8:
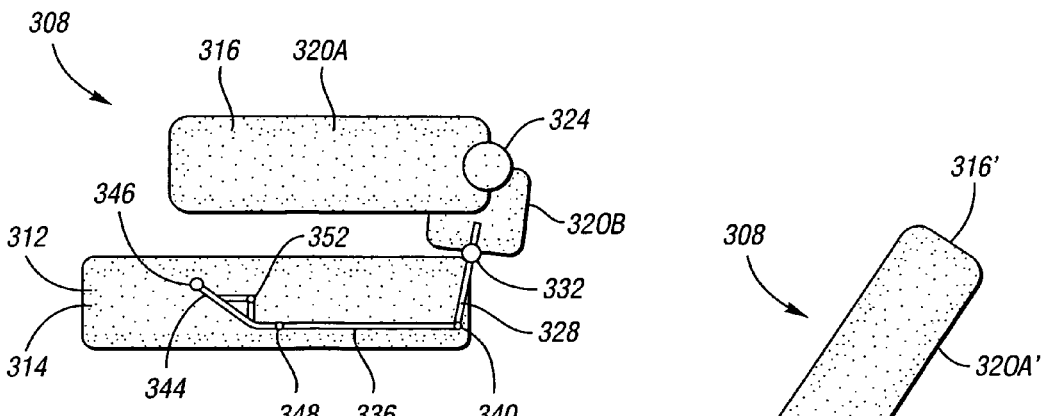
FIG. 8 is a schematic side sectional view of a seat assembly having a seatback portion in a stowed position and that includes a first segment pivotable with respect to a second segment.

FIGS. 8-17 depict alternative embodiments of the concept depicted in FIG. 3. Referring to FIG. 8, seat assembly 308 includes lower seat portion 312 (having cushion 314) and seatback portion 316. Seatback portion 316 includes an upper segment 320A and a lower segment 320B. Segment 320A is pivotably connected to segment 320B at pivot 324. Segment 320B is pivotable with respect to the lower seat portion 312 about pivot 332. More specifically, a first link 328 extends from the lower seat portion cushion 314 to the lower segment 320B of the seatback portion 316, and is pivotable about pivot 332. The first link 328 is connected to a second link 336 via joint 340. The second link 336 is connected to a third link 344 via joint 348. The third link 344 is pivotable about pivot 352 and includes a bar portion 346 at one end. The bar portion 346 extends transversely across the width of the lower seat portion 312.

Figure 9:
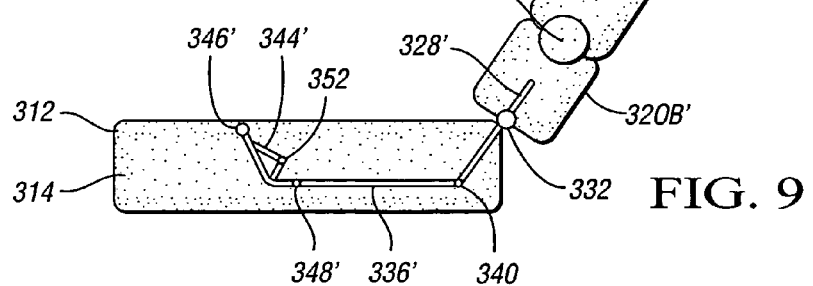
FIG. 9 is a schematic side sectional view of the seat assembly of FIG. 8 with the seatback portion in an upright position.

The links shown in FIG. 8 operate substantially the same as the links shown and described in FIG. 3. The lower segment 320B of the seatback portion 316 is pivotable between a first position as shown in FIG. 8, and a second position shown at 320B' in FIG. 9. Referring to FIG. 9, wherein like reference numbers refer to like components from FIG. 8, when the lower segment of the seatback portion is pivoted and reclined to the second position, the first link rotates about pivot 332 to a second position shown at 328', which causes forward movement of the second link 336'. The second link causes the third link to rotate about pivot 352, causing the bar to move vertically, i.e., upward from a first position, as shown in FIG. 8, to a second position as shown at 346' in FIG. 9. The bar 346' in the second position is configured to interact with a seat occupant to restrain the occupant's lower torso in the event of a vehicle impact.

The upper segment 320A of the seatback portion 316 is shown in a stowed position in FIG. 8, in which the upper segment 320A is generally horizontally oriented and juxtaposed with the lower seat portion 312 to minimize the vertical height of the seat assembly 308, thereby providing increased cargo space above the seat assembly. The upper segment is rotatable about pivot 324 to a deployed position shown at 320A' in FIG. 9, in which the upper segment aligns with the lower segment to accommodate an occupant of the seat assembly 308. A locking device (not shown) releasably locks the upper segment and the lower segment for unitary movement when the upper segment is in the deployed position.

Thus, the pivot 324 enables the seatback portion 316 of the seat assembly 308 to be stowed for increased cargo capacity without causing movement of the bar 346. In other words, providing an upper segment that can move independently of the lower segment enables independent movement of a portion of the seatback and the bar 346.

Figure 10:
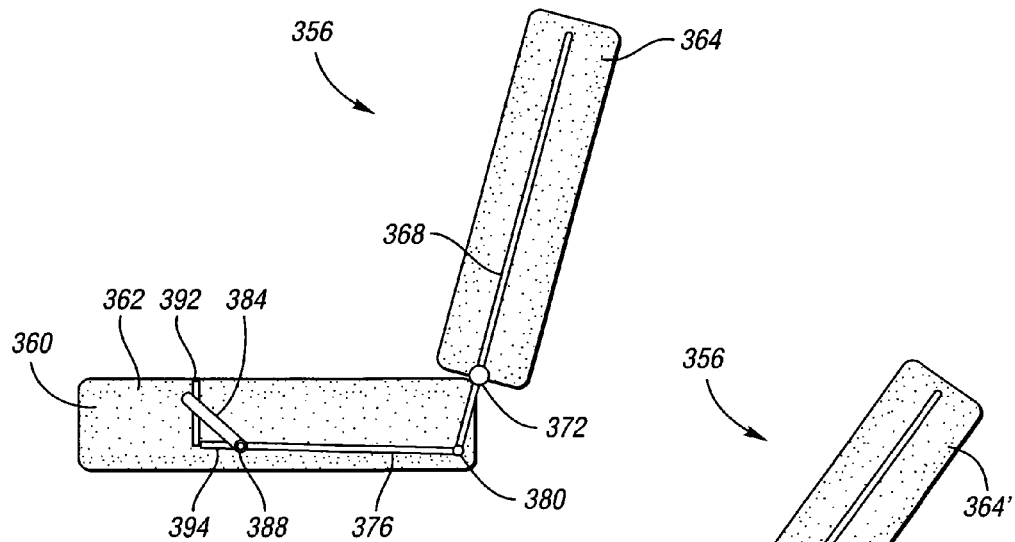
FIG. 10 is a schematic side sectional view of a seat assembly with a member movable along tracks inside the lower seat portion cushion.

Referring to FIG. 10, seat assembly 356 includes lower seat portion 360 (with cushion 362) and seatback portion 364. The seatback portion 364 is rotatable with respect to the lower seat portion 360 about pivot 372. More specifically, a first link 368 extends from the lower seat portion cushion to the seatback portion 364, and is pivotable about pivot 372. The first link 368 is connected to a second link 376 via joint 380. The second link 376 is connected to a bar 384 via joint 388. A first track member 392 and a second track member 394 are operatively connected with respect to the lower seat portion 360, and the bar 384 is operatively connected to, and selectively movable along, the track members 392, 394.

Figure 11:
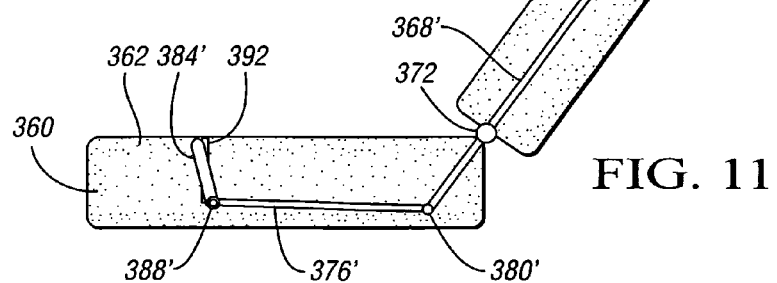
FIG. 11 is a schematic side sectional view of the seat assembly of FIG. 10 with the seatback member further reclined and the member further elevated relative to their respective positions in FIG. 10.

The seatback portion 364 is rotatable about pivot 372 between a first position, as shown in FIG. 10, and a second position shown at 364' in FIG. 11 to increase its reclination angle. Referring to FIG. 11, wherein like reference numbers refer to like components from FIG. 10, when the seatback portion is rotated and reclined to the second position, the first link rotates about pivot 372 to a second position shown at 368', which causes forward movement of the second link 376'. The second link causes the bar to move generally horizontally along track member 394 and generally vertically along track member 392, causing the bar to move to a second position shown at 384'. The bar 384' in the second position is configured to interact with a seat occupant to restrain the occupant's lower torso in the event of a vehicle impact.

Figure 12:
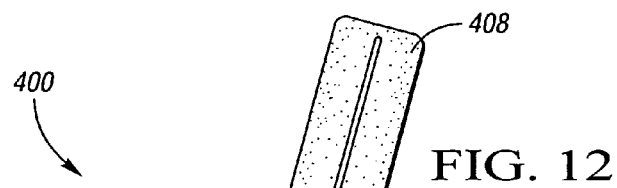
FIG. 12 is a schematic side sectional view of a seat assembly with a member that is pivotable inside the lower seat portion cushion, and a cable operatively interconnecting the member and the seatback portion.

Referring to FIG. 12, seat assembly 400 includes lower seat portion 404 (with cushion 406) and seatback portion 408. Seatback portion 408 is selectively rotatable about pivot 412 to vary the seatback portion's reclination angle. The seat assembly also includes a flexible member, such as cable 416, that is operatively connected to seatback portion 408 via pivot 412, which also acts as a cable take-up drum. An idler pulley 420 is connected with respect to the lower seat portion 404 and guides the movement of the cable 416 described below.

Link 422 includes a bar 423 at one end, and is selectively rotatable about pivot 424. The cable 416 is connected to the link 422.

Figure 13:
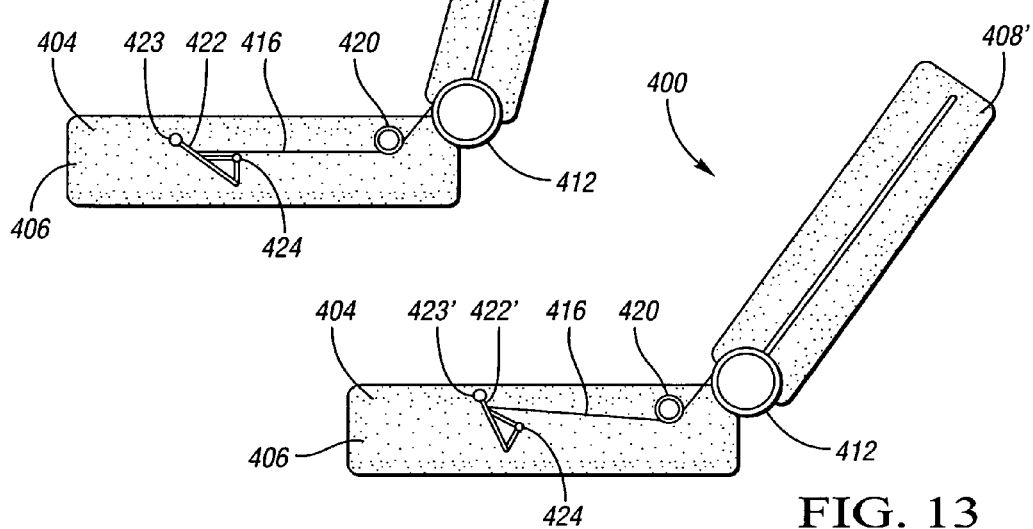
FIG. 13 is a schematic side sectional view of the seat assembly of FIG. 12 with the seatback member further reclined and the member further elevated relative to their respective positions in FIG. 12.

The seatback portion is selectively reclinable from a first position, as shown in FIG. 12, to a second position as shown at 408' in FIG. 13. Referring to FIG. 13, wherein like reference numbers refer to like components from FIG. 12, when the seatback portion is moved to the position shown at 408', the cable 416 is partially wound around the take-up drum 412. The movement of the cable 416 causes the link to rotate about pivot 424 to the position shown at 422', thereby elevating the bar to the position shown at 423'.

Figure 14:
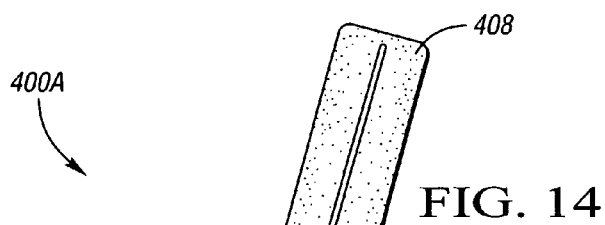
FIG. 14 is a schematic side sectional view of a seat assembly with a member that is movable inside the lower seat portion cushion along a track, and a cable operatively interconnecting the member and the seatback portion.
Figure 15:
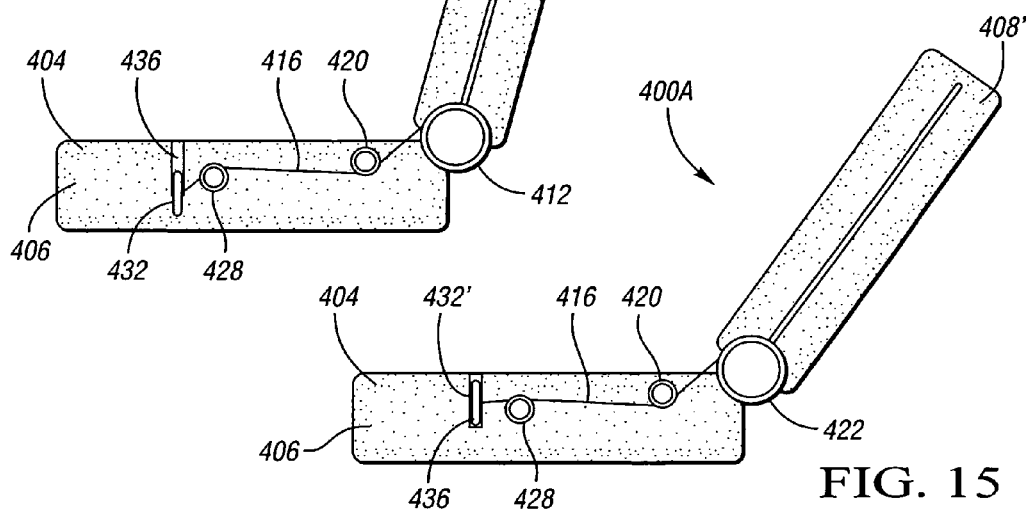
FIG. 15 is a schematic side sectional view of the seat assembly of FIG. 14 with the seatback member further reclined and the member further elevated relative to their respective positions in FIG. 14.

Referring to FIGS. 14 and 15, wherein like reference numbers refer to like components from FIGS. 12 and 13, an alternative seat assembly 400A is schematically depicted. The seat assembly 400A is substantially identical to the seat assembly 400 of FIGS. 12 and 13, except the link 422, pivot 424, and bar 423 are replaced by a second idler pulley 428, a bar 432 connected to the cable 416, and a track 436 along which the bar 432 is selectively movable up and down. When the cable 416 is retracted by the reclination of the seatback portion to the position shown at 408', the idler pulley 428 directs movement of the cable 416 in an up and down direction, which causes the bar 432 to move upward along the track 436 to the position shown at 432'.

Figure 16:
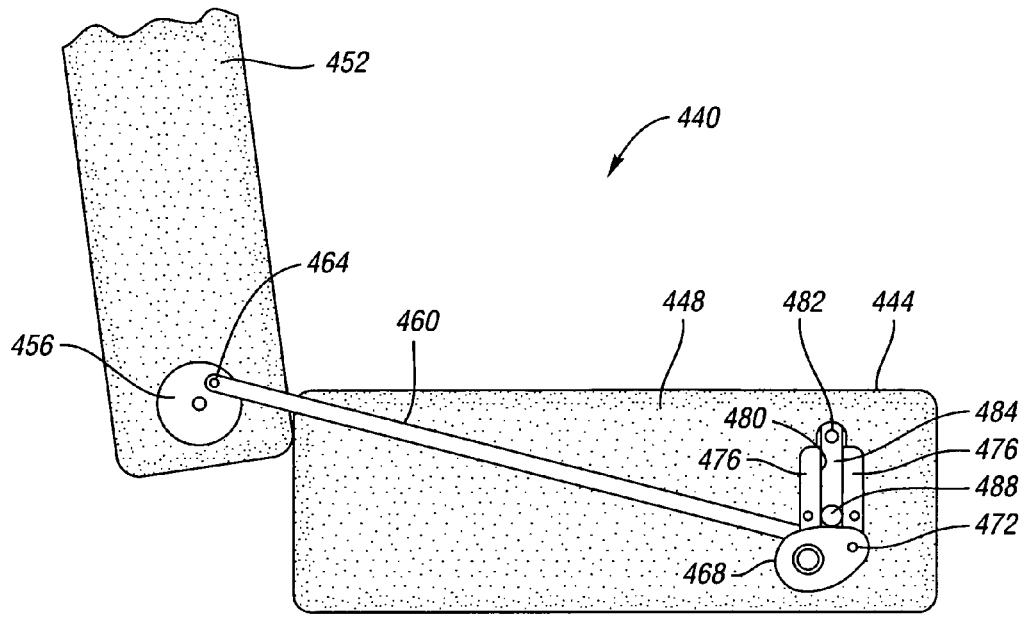
FIG. 16 is a schematic side sectional view of a seat assembly with a cam rotatable inside the lower seat portion cushion, and a member operatively interconnecting the cam and the seatback portion.

Referring to FIG. 16, seat assembly 440 includes a lower seat portion 444 (including cushion 448) and a seatback portion 452. The seatback portion 452 is pivotable with respect to the lower seat portion 444 to vary its reclination angle. The seatback portion 452 includes a disk 456 that is pivotably connected to member 460 at pivot 464. Member 460 is connected to cam 468 at pivot 472. Members 476 are connected to the lower seat portion and define a vertical track 480 therebetween. A member 484 includes a bar 482 that extends transversely inside the seat cushion 448. Member 484 is rotatably connected to roller 488, which is engaged with the cam surface of cam 468.

Figure 17:
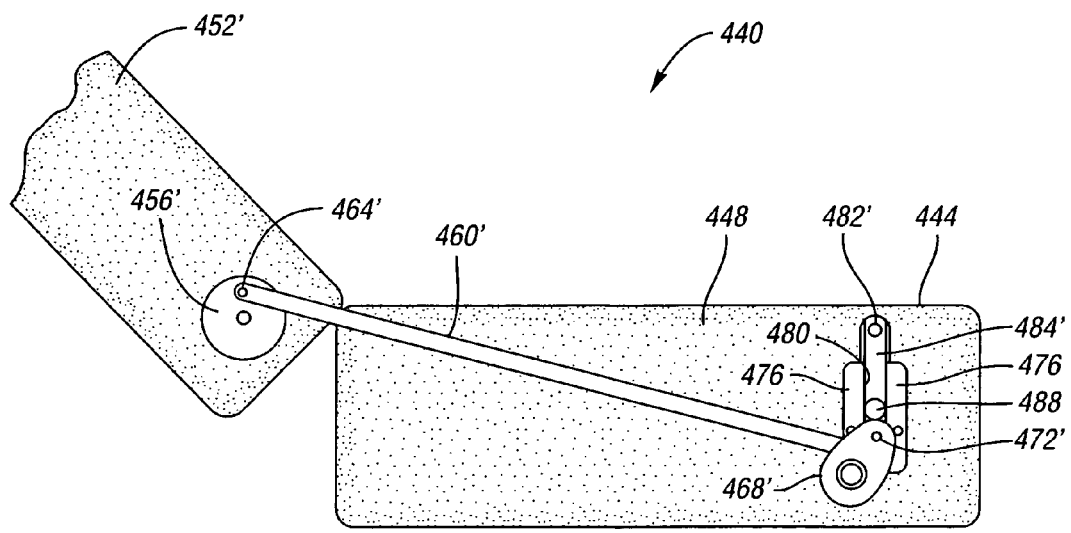
FIG. 17 is a schematic side sectional view of the seat assembly of FIG. 16 with the seatback member further reclined and a member further elevated by the cam relative to its position in FIG. 16.

The seatback portion is selectively reclinable from a first position, as shown in FIG. 16, to a second position as shown at 452' in FIG. 17. Referring to FIG. 17, wherein like reference numbers refer to like components from FIG. 16, when the seatback portion is moved to the position shown at 452', the disk is rotated from the position shown at 456 to the position shown at 456', which causes movement of the member to a second position shown at 460' and the movement of pivot 464 to a second position shown at 464'. The movement of member 460 causes the cam to rotate from the position shown at 468 to the position shown at 468' and the movement of pivot 472 to a second position shown at 472'. The cam surface acts on the roller 488, causing the roller and, correspondingly, the member 484 and the bar 482, to rise to positions shown at 484' and 482', respectively.

The embodiments shown in FIGS. 8-17 may be modified to include a power actuator, such as the one shown in FIG. 4, so that movement of members 346, 384, 423, 432, and 482 may be accomplished by the power actuator, in response to an impact sensors or a collision avoidance system.

It should be noted that, in each of the embodiments depicted, a first part of the lower seat portion is selectively vertically movable to an elevated position relative to a second part of the lower seat portion; it is desirable for the first part to be locked in the elevated position to function as an occupant restraint.

While the best modes for carrying out the invention have been described in detail, those familiar with the art to which this invention relates will recognize various alternative designs and embodiments for practicing the invention within the scope of the appended claims.

The invention claimed is:

1. A vehicle restraint system comprising:
a vehicle seat assembly including a lower seat portion and a seatback portion;
said seatback portion being characterized by a reclination angle;
said seatback portion being selectively movable to vary the reclination angle;
said lower seat portion being characterized by a tilt angle;
said lower seat portion including a cushion and a member extending inside the cushion and being selectively movable with respect to the cushion;
wherein said seat assembly is configured such that the tilt angle is independent of the reclination angle and the member automatically moves relative to the cushion in response to a change in the reclination angle of the seatback portion.

2. The vehicle restraint system of claim 1, wherein the member is mechanically coupled to the seat back portion in a predetermined relationship such that movement of the seatback portion resulting in an increase in the reclination angle automatically causes the member to rise.

3. The vehicle restraint system of claim 2, wherein the member extends transversely inside the cushion and is configured to restrain the lower torso of an occupant of the seat assembly.

4. The vehicle restraint system of claim 3, further comprising at least one pivot; and wherein said member is pivotable about the pivot.

5. The vehicle restraint system of claim 3, further comprising at least one track; and wherein said member is operatively connected to the track.

6. The vehicle restraint system of claim 3, further comprising at least one second member operatively coupling the member and the seatback portion.

7. The vehicle restraint system of claim 3, further comprising a flexible member mechanically coupling the member and the seatback portion.

8. The vehicle restraint system of claim 3, further comprising a cam operatively connected to the seatback portion and configured to raise the member.

9. The vehicle restraint system of claim 2, wherein the seatback portion includes a first segment mechanically coupled to the member extending inside the cushion of the lower seat portion, and a second segment selectively movable with respect to the first segment to enable the seatback portion to move to a stowed position without causing movement of the member extending inside the cushion of the lower seat portion.

* * * * *